Nov. 12, 1968   H. W. MARTIN   3,410,981
BROILER LID IMPROVEMENT FOR FRY PANS
Filed Oct. 28, 1966

WITNESSES
Robert C. Baird
James F. Young

INVENTOR
Harold W. Martin
BY
AGENT

3,410,981
BROILER LID IMPROVEMENT FOR FRY PANS
Harold W. Martin, Martinville, N.J., assignor to Westinghouse Electric Corporation, Pittsburgh, Pa., a corporation of Pennsylvania
Filed Oct. 28, 1966, Ser. No. 590,266
6 Claims. (Cl. 219—386)

This invention relates, in general, to domestic appliance and, more particularly, to electric cooking apparatus.

Cookware such as electric fry pans which have been in use for many years, led, more recently, to the development of what is commonly referred to in the industry as a "broiler fry pan." Such a unit comprises the conventional electric fry pan and a lid or cover with a heating element supported therein, which heating element is disposed above the foodstuff being cooked.

A probe type control adapted to be connected to the terminals of either heating element projects through an opening in a vertical wall of the lid when the apparatus is to be used for broiling. The opening is thereby adequately blocked by the probe control, however, when the heater is removed and used as a fry pan the opening is unblocked thereby allowing hot vapors to escape and condense on the handle. This condition is magnified when the heating element in the lid is removed thereby unblocking similar openings through which the terminals of the heating element normally extend. This, obviously, is undesirable to the user as well as detrimental to proper cooking.

Accordingly, it is the general object of this invention to provide a new and improved lid or cover for domestic cooking apparatus.

It is a more particular object of this invention to provide, in a lid or cover for cooking apparatus, new and improved closure means for preventing undesirable escapement of hot vapors.

Briefly, the present invention accomplishes the above-cited objects by providing an L-shaped closure member which is hingedly mounted to a broiler fry pan lid by means of existing structure. To this end the closure member is captivated between one wall of the lid and a substantially U-shaped member secured to the one wall and forming a part of an electrical protection shield. The complementary elements of the closure member are provided with locking means cooperating with the U-shaped member to selectively secure one of the complementary elements in a first position wherein it covers the openings in the lid to prevent escapement of hot vapors or to latch the same element such that it does not interfere with proper installation and operation of the apparatus when used for broiling.

These and other objects and advantages of the present invention will become more apparent when considered in view of the following detailed description and drawings, in which.

Figure 1:
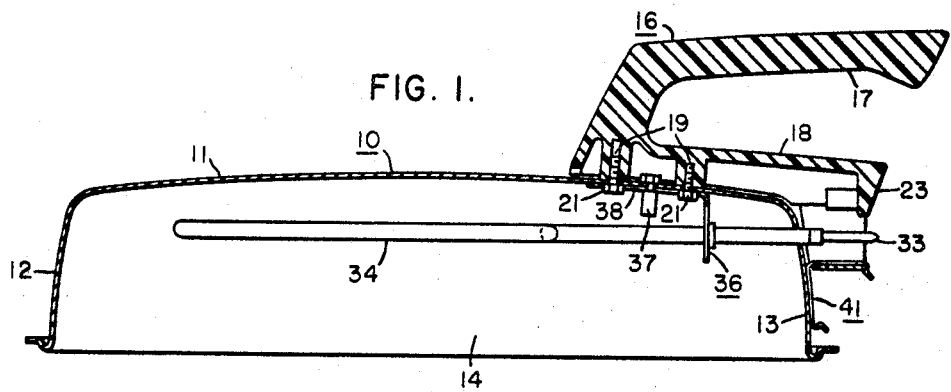
FIGURE 1 is a side elevational view, in section, of a broiler fry pan lid representing the invention.

Referring to the drawings, especially FIG. 1, referred character 10 designates generally a substantially dish-shaped broiler fry pan lid having a top cover and depending front, rear and side walls 11, 12, 13 and 14, respectively.

Figure 4:
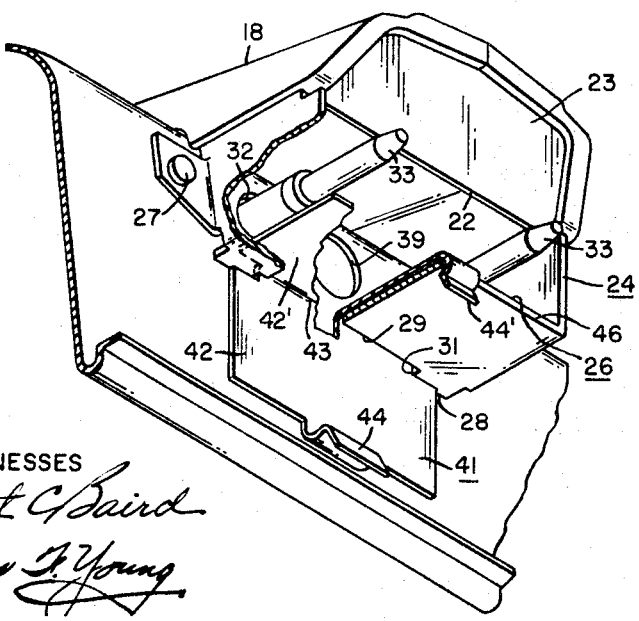
FIG. 4 is an enlarged fragmentary perspective view of the lid shown in FIG. 1.

Attached to the top wall 11 is a handle 16, made from any suitable material, for example, plastic. The handle 16 comprises a hand gripping segment 17 and a base segment 18 provided with a pair of blind bores 19 for receiving a pair of self-tapping screws 21. The rear edge 22 (see particularly FIG. 4) of a sloping rear wall 23 cooperates with a U-shaped member 24 (FIG. 4) to form a receptacle 26 for receiving a probe control, not shown.

The U-shaped member 24 is secured to the rear wall 13 in any suitable manner, for example, by the use of rivets 27. A lower edge 28 of the U-shaped member is indented or cut back as indicated at 29 such that a slot 31 is formed between the rear wall 13 and the U-shaped member.

A pair of openings 32 provided in the rear 13 and framed by the receptacle 26 permit terminals 33 of a heater element 34 to extend through the wall 13 and into the receptacle 26. The heater element 34 is supported within the lid 10 by means of an L-shaped mounting bracket 36 and a rotatable lock member 37 suspended from the top wall 11 and insertable through a longitudinal slot 38 in the bracket 36. The heater element 34 may be readily removed by rotation of the lock member 37 such that it may be withdrawn through the slot 38. It will be understood that when the heater element is removed the terminals 33 are withdrawn from the openings 32 thereby leaving them unblocked. An opening 39 adapted to permit insertion of the sensing portion of a probe type control into the interior of the lid 10 will be unblocked when the lid 10 is, at the option of the user, utilized as a cover for a conventional fry pan. It will, therefore, be seen that at certain times there could be as many as three openings in the lid 10 which would be uncovered thereby creating a hazardous condition and producing inefficient cooking as pointed out above.

Figure 2:
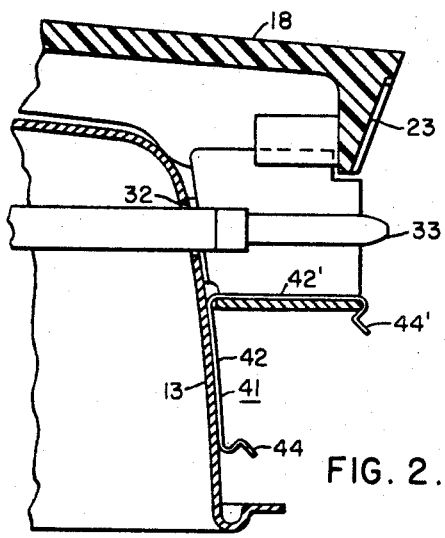
FIG. 2 is an enlarged fragmentary view of the lid shown in FIG. 1 illustrating the inoperative of a closure member.
Figure 3:
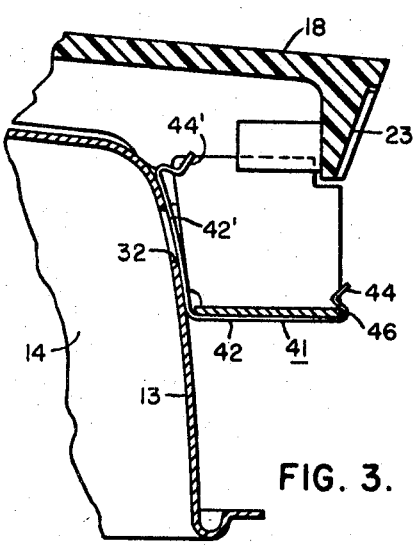
FIG. 3 is an enlarged fragmentary view similar to that of FIG. 2 but with the closure member in its operative position.

In accordance with the present invention there is provided a closure member 41 bent or otherwise suitably worked to form mutually perpendicular walls or flap members 42 and 42'. The bight portion 43 intermediate the walls 42 and 42' is captivated between the wall 13 and the U-shaped member 24 to provide pivotal mounting thereof such that the wall 42' which is disposed within the receptacle 26 may move from a first position as shown in FIG. 2 to a second position as shown in FIG. 3. In the second position the wall 42' serves to block the openings 32 and 39 to prevent escapement of hot vapors therefrom.

The wall 42 is provided with a clip portion 44 which engages an edge 46 of the U-shaped member 24 in order to positively latch the closure member 41 in the hole blocking position shown in FIG. 3. The member 41 is preferably fabricated from metal, therefore, to insure that the flap 42' does not inadvertently bridge the terminals 33, the flap 42 is provided with a clip 44' which engages the edge 46 as shown in FIG. 2.

Since numerous changes may be made in the above described apparatus and definite embodiments of the invention may be made without departing from the spirit thereof, it is intended that all matter contained in the foregoing description or shown in the accompanying drawings, shall be interpreted as illustrative and not in a limiting sense.

What is claimed is:

1. Cover structure for cooking apparatus, said structure comprising: a top wall and depending side, front and rear walls, a heater element having terminals and being removably supported by said top wall, said terminals projecting through apertures in one of said depending walls, said one of said depending walls being provided with an aperture for receiving a probe control, and means supported adjacent said openings for selective blocking thereof whereby hot vapors generated in said cooking apparatus may be prevented from escaping through said openings.

2. Structure as specified in claim 1, including means for pivotally mounting said means for blocking said apertures for movement between aperture-blocking and aperture-unblocking positions.

3. Structure as specified in claim 2, wherein said mounting means comprises a receptacle including a U-shaped member secured to said rear wall such that said aperture blocking means is captivated between the former and the latter.

4. Structure as specified in claim 3, wherein said aperture blocking means comprises mutually perpendicular flaps each having means for positively and selectively latching said blocking means in a first position wherein said apertures are obstructed and a second position wherein said apertures are unobstructed.

5. Structure as specified in claim 4, wherein said latch means cooperates with said U-shaped member in said first and second positions.

6. Structure as specified in claim 5, including a handle secured to said top wall, said handle having a wall the lower edge of which cooperates with said U-shaped member for forming a receptacle for receiving a probe type control.

References Cited

UNITED STATES PATENTS

| | | | |
|---|---|---|---|
| 3,218,434 | 11/1965 | Lee et al. | 219—433 |
| 3,304,407 | 2/1967 | Clark et al. | 219—435 |

BERNARD A. GILHEANY, *Primary Examiner.*

R. N. ENVALL, JR., *Assistant Examiner.*